(12) United States Patent
Cohen et al.

(10) Patent No.: US 11,829,953 B1
(45) Date of Patent: Nov. 28, 2023

(54) DIGITAL PROCESSING SYSTEMS AND METHODS FOR MANAGING SPRINTS USING LINKED ELECTRONIC BOARDS

(71) Applicant: Monday.com LTD., Tel Aviv (IL)

(72) Inventors: Itay Cohen, Ramat Gan (IL); Sergei Safrigin, Ramat Gan (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 18/148,881

(22) Filed: Dec. 30, 2022

Related U.S. Application Data

(63) Continuation-in-part of application No. 18/048,131, filed on Oct. 20, 2022, which is a continuation of application No. 17/242,452, filed on Apr. 28, 2021, now Pat. No. 11,501,255.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, (Continued)

(51) Int. Cl.
*G06Q 10/10* (2023.01)
*G06Q 10/06* (2023.01)
*G06F 16/22* (2019.01)

(52) U.S. Cl.
CPC ......... *G06Q 10/103* (2013.01); *G06F 16/221* (2019.01)

(58) Field of Classification Search
CPC ............................ G06Q 10/103; G06F 16/221
USPC ................................................. 705/1.1–912
See application file for complete search history.

(56) References Cited

U.S. PATENT DOCUMENTS 4,972,314 A 11/1990 Getzinger et al.
5,220,657 A 6/1993 Bly et al.
(Continued)

FOREIGN PATENT DOCUMENTS

CA 2828011 A1 9/2012
CN 103064833 A 4/2013
(Continued)

OTHER PUBLICATIONS

D'Elessio et al., Monday.com Walkthrough 2018/All Features, Platforms & Thoughts, Mar. 1, 2018, pp. 1-55, 2018.
(Continued)

*Primary Examiner* — Jonathan P Ouellette
(74) *Attorney, Agent, or Firm* — Finnegan, Henderson, Farabow, Garrett & Dunner LLP

(57) ABSTRACT

Systems, methods, and computer-readable media for managing a plurality of sprints using a plurality of electronically linked boards are disclosed. A low-level board with rows and columns is generated, containing sprint-related function data associated with the plurality of sprints. At least one internal column and at least one external column are generated on the low-level board, for linking to an associated high-level board. Group-by controls are presented, and in response to activation of an internal control, rows on the low-level are organized board into first groups based on common internal column data. In response to activation of the external control, rows on the low-level board are reorganized into second groups by common external column data. Links to the at least one associated high-level board are accessed on the low-level board, and data from the at least one associated high-level board is extracted and imported onto the low-level board.

20 Claims, 9 Drawing Sheets

Related U.S. Application Data provisional application No. 63/019,396, filed on May 3, 2020, provisional application No. 63/018,593, filed on May 1, 2020.

(56) References Cited

U.S. PATENT DOCUMENTS

| | | |
|---|---|---|
| 5,479,602 A | 12/1995 | Baecker et al. |
| 5,517,663 A | 5/1996 | Kahn |
| 5,632,009 A | 5/1997 | Rao et al. |
| 5,682,469 A | 10/1997 | Linnett et al. |
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,438 A | 1/2000 | Wakayama |
| 6,016,553 A | 1/2000 | Schneider et al. |
| 6,023,695 A | 2/2000 | Osborn et al. |
| 6,034,681 A | 3/2000 | Miller et al. |
| 6,049,622 A | 4/2000 | Robb et al. |
| 6,088,707 A | 7/2000 | Bates et al. |
| 6,108,573 A | 8/2000 | Debbins et al. |
| 6,111,573 A | 8/2000 | McComb et al. |
| 6,167,405 A | 12/2000 | Rosensteel, Jr. et al. |
| 6,169,534 B1 | 1/2001 | Raffel et al. |
| 6,182,127 B1 | 1/2001 | Cronin et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin, III et al. |
| 6,522,347 B1 | 2/2003 | Tsuji et al. |
| 6,527,556 B1 | 3/2003 | Koskinen |
| 6,567,830 B1 | 5/2003 | Madduri |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 6,988,248 B1 | 1/2006 | Tang et al. |
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,489,976 B2 | 2/2009 | Adra |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,827,615 B1 | 11/2010 | Allababidi et al. |
| 7,916,157 B1 | 3/2011 | Kelley et al. |
| 7,921,360 B1 | 4/2011 | Sundermeyer et al. |
| 7,933,952 B2 | 4/2011 | Parker et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater, Jr. |
| 8,635,520 B2 | 1/2014 | Christiansen et al. |
| 8,677,448 B1 | 3/2014 | Kauffman et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 | 9/2014 | Kwiatkowski et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,063,958 B2 | 6/2015 | Müller et al. |
| 9,129,234 B2 | 9/2015 | Campbell et al. |
| 9,159,246 B2 | 10/2015 | Rodriguez et al. |
| 9,172,738 B1 | 10/2015 | daCosta |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,424,545 B1 | 8/2016 | Lee |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,519,699 B1 | 12/2016 | Kulkarni et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,794,256 B2 | 10/2017 | Kiang et al. |
| 9,798,829 B1 | 10/2017 | Baisley |
| 9,811,676 B1 | 11/2017 | Gauvin |
| 9,866,561 B2 | 1/2018 | Psenka et al. |
| 9,870,136 B2 | 1/2018 | Pourshahid |
| 10,043,296 B2 | 8/2018 | Li |
| 10,067,928 B2 | 9/2018 | Krappe |
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |

(56) References Cited

U.S. PATENT DOCUMENTS

| | | |
|---|---|---|
| 10,311,080 B2 | 6/2019 | Folting et al. |
| 10,318,624 B1 | 6/2019 | Rosner et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,546,001 B1 | 1/2020 | Nguyen et al. |
| 10,564,622 B1 | 2/2020 | Dean et al. |
| 10,573,407 B2 | 2/2020 | Ginsburg |
| 10,579,724 B2 | 3/2020 | Campbell et al. |
| 10,587,714 B1 | 3/2020 | Kulkarni et al. |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,733,256 B2 | 8/2020 | Fickenscher et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,010,371 B1 | 5/2021 | Slomka et al. |
| 11,030,259 B2 | 6/2021 | Mullins et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,086,894 B1 | 8/2021 | Srivastava et al. |
| 11,222,167 B2 | 1/2022 | Gehrmann et al. |
| 11,243,688 B1 | 2/2022 | Remy et al. |
| 11,429,384 B1 * | 8/2022 | Navert ............... G06F 8/77 |
| 11,620,615 B2 * | 4/2023 | Jiang ............... H04L 12/1822 709/204 |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065848 A1 | 5/2002 | Walker et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0031764 A1 | 2/2006 | Keyser et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |

(56) References Cited

U.S. PATENT DOCUMENTS

| | | |
|---|---|---|
| 2007/0233647 A1 | 10/2007 | Rawat et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons et al. |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0248710 A1 | 10/2009 | McCormack et al. |
| 2009/0271696 A1 | 10/2009 | Bailor et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez Veron et al. |
| 2011/0225525 A1 | 9/2011 | Chasman et al. |
| 2011/0231273 A1 | 9/2011 | Buchheit |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233150 A1 | 9/2012 | Naim et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Sitrick et al. |
| 2012/0297307 A1 | 11/2012 | Rider et al. |
| 2012/0303262 A1 | 11/2012 | Alam et al. |
| 2012/0304098 A1 | 11/2012 | Kuulusa |

(56) References Cited

U.S. PATENT DOCUMENTS

| | | |
|---|---|---|
| 2012/0311496 A1 | 12/2012 | Cao et al. |
| 2012/0311672 A1 | 12/2012 | Connor et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Sitrick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1 | 2/2013 | Barrett-Kahn et al. |
| 2013/0055113 A1 | 2/2013 | Chazin et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter et al. |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2013/0339051 A1 | 12/2013 | Dobrean |
| 2014/0006326 A1 | 1/2014 | Bazanov |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0082525 A1 | 3/2014 | Kass et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0215303 A1 | 7/2014 | Grigorovitch et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0188964 A1 | 7/2015 | Sharma et al. |
| 2015/0212717 A1 | 7/2015 | Nair et al. |
| 2015/0220491 A1 | 8/2015 | Cochrane et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur Bache et al. |
| 2016/0275150 A1 | 9/2016 | Bournonnais et al. |
| 2016/0299655 A1 | 10/2016 | Migos et al. |
| 2016/0308963 A1 | 10/2016 | Kung |
| 2016/0321235 A1 | 11/2016 | He et al. |
| 2016/0321604 A1 | 11/2016 | Imaeda et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza Tascon |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | Lore et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |

(56) References Cited

U.S. PATENT DOCUMENTS

| | | |
|---|---|---|
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177888 A1 | 6/2017 | Arora et al. |
| 2017/0185668 A1 | 6/2017 | Convertino et al. |
| 2017/0200122 A1 | 7/2017 | Edson et al. |
| 2017/0206366 A1 | 7/2017 | Fay et al. |
| 2017/0212924 A1 | 7/2017 | Semlani et al. |
| 2017/0220813 A1 | 8/2017 | Mullins et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0301039 A1 | 10/2017 | Dyer et al. |
| 2017/0315683 A1 | 11/2017 | Boucher et al. |
| 2017/0315974 A1 | 11/2017 | Kong et al. |
| 2017/0315979 A1 | 11/2017 | Boucher et al. |
| 2017/0324692 A1 | 11/2017 | Zhou |
| 2017/0351252 A1 | 12/2017 | Kleifges et al. |
| 2017/0372442 A1 | 12/2017 | Mejias |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0276417 A1 | 9/2018 | Cerezo Sanchez |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0012342 A1 | 1/2019 | Cohn |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0123924 A1 | 4/2019 | Embiricos et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0147030 A1* | 5/2019 | Stein ............... H04L 67/02 715/217 |
| 2019/0155821 A1 | 5/2019 | Dirisala |
| 2019/0179501 A1 | 6/2019 | Seeley et al. |
| 2019/0208058 A1 | 7/2019 | Dvorkin et al. |
| 2019/0236188 A1 | 8/2019 | McKenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0192785 A1 | 6/2020 | Chen |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |

(56) References Cited

U.S. PATENT DOCUMENTS

| | | |
|---|---|---|
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0014136 A1 | 1/2021 | Rath |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0035069 A1* | 2/2021 | Parikh .................... G06Q 30/04 |
| 2021/0042796 A1 | 2/2021 | Khoury et al. |
| 2021/0049524 A1* | 2/2021 | Nachum ............. G06Q 10/067 |
| 2021/0049555 A1* | 2/2021 | Shor .................. G06Q 10/0635 |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0264220 A1 | 8/2021 | Wei et al. |
| 2021/0326519 A1 | 10/2021 | Lin et al. |
| 2022/0221591 A1 | 7/2022 | Smith et al. |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 112929172 A | 6/2021 |
| EP | 3443466 B1 | 12/2021 |
| KR | 20150100760 | 9/2015 |
| WO | WO 2004100015 A2 | 11/2004 |
| WO | WO 2006116580 A2 | 11/2006 |
| WO | WO 2008109541 A1 | 9/2008 |
| WO | WO 2017202159 A1 | 11/2017 |
| WO | WO 2020187408 A1 | 9/2020 |
| WO | WO 2021096944 A1 | 5/2021 |
| WO | WO 2021144656 A1 | 7/2021 |
| WO | WO 2021161104 A1 | 8/2021 |
| WO | WO 2021220058 A1 | 11/2021 |

OTHER PUBLICATIONS

Rordigo et al., Project Management with Monday.com: a 101 Introduction; Jul. 22, 2019, pp. 1-21, 2019.

International Search Report and Written Opinion of the International Searching Authority in PCT/IB2020/000658, dated Nov. 11, 2020 (12 pages).

International Search Report in PCT/IB2020/000974, dated May 3, 2021 (19 pages).

International Search Report in PCT/IB2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/162020/000024, dated May 3, 2021 (13 pages).

"Pivot table—Wikipedia"; URL: https://en.wikepedia.org/w/index.php?title=Pivot_table&oldid=857163289, originally retrieve on Oct. 23, 2019; retrieved on Jul. 16, 2021.

Vishal Singh, "A Theoretical Framework of a Bim-based Multi-Disciplinary Collaboration Platform", Nov. 5, 2020, Automation in Construction, 20 (2011), pp. 134-144 (Year: 2011).

Edward a. Stohr, Workflow Automation: Overview and Research Issues, 2001, Information Systems Frontiers 3:3, pp. 281-296 (Year: 2001).

International Search Report and Written Opinion of the International Search Authority in PCT/IB2021/000297, dated Oct. 12, 2021 (20 pages).

Dapulse.com "features".extracted from web.archive.or/web/2014091818421/https://dapulse.com/features; Sep. 2014 (Year: 2014).

Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

Sajjad Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018.

Pedersen et al., "Tivoli: an electronic whiteboard for informal workgroup meetings", Conference on Human Factors in Computing Systems: Proceedings of the Interact '93 and CHI '93 conference on Human factors in computing systems; Apr. 24-29, 1993:391-398. (Year 1993).

Kollmann, Franz, "Realizing Fine-Granular Read and Write Rights on Tree Structured Documents." in the Second International Conference on Availability, Reliability and Security (ARES'07), pp. 517-523. IEEE, 2007. (Year: 2007).

Baarslag, "Negotiation as an Interaction Mechanism for Deciding App Permissions." in Proceedings of the 2016 CHI Conference Extended Abstracts on Human Factors in Computing Systems, pp. 2012-2019. 2016 (Year: 2016).

Peltier, "Clustered and Stacked Column and Bar Charts", Aug. 2011, Peltier Technical Services, Inc., pp. 1-128; (Year: 2011).

Beate List, "An Evaluation of Conceptual Business Process Modelling Languages", 2006, SAC'06, Apr. 23-27, pp. 1532-1539 (Year: 2006).

"Demonstracion en espanol de Monday.com", published Feb. 20, 2019. https://www.youtube.com/watch?v=z0qydTgof1A (Year: 2019).

Desmedt, Yvo, and Arash Shaghaghi, "Function-Based Access Control (FBAC) From Access Control Matrix to Access Control Tensor." in Proceedings of the 8th ACM CCS International Workshop on Managing Insider Security Threats, pp. 89-92. (2016).

Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).

Gutwin, C. et al., "Supporting Informal Collaboration in Shared-Workspace Groupware", J. Univers. Comput. Sci., 14(9), 1411-1434 (2008).

Barai, S., et al., "Image Annotation System Using Visual and Textual Features", In: Proceedings of the 16th International Conference on Distributed Multi-media Systems, pp. 289-296 (2010).

B. Ionescu, C. Gadea, B. Solomon, M. Trifan, D. Ionescu and V. Stoicu-Tivadar, "Achat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).

Susanne Hupfer, Li-Te Cheng, Steven Ross, and John Patterson. 2004. Introducing collaboration into an application development environment. In Proceedings of the 2004 ACM conference on Computer supported cooperative work (CSCW '04). Association for Computing Machinery, New York, NY, USA, 21-24 (Year: 2004).

\* cited by examiner

∨ High (87-5-10)

| | Task | Owner | Status | Priority | Type | Role | Task Description | Estimated SP ⓘ | Dependent On ⓘ |
|---|---|---|---|---|---|---|---|---|---|
| ☐ | Task 4 | ⊕ | Done | High | Feature | Dev | | 5 SP | |
| ☐ | Task 6 | 👤 | Ready | High | Feature | Dev | | 3 SP | |
| | + Add Task | | | | | | | 8 SP sum | |

∨ Medium (87-5-20, 87-5-70)

| | Task | Owner | Status | Priority | Type | Role | Task Description | Estimated SP ⓘ | Dependent On ⓘ |
|---|---|---|---|---|---|---|---|---|---|
| ☐ | Task 3 | ⊕ | Done | Medium | Feature | Dev | | 2 SP | |
| ☐ | Task 5 | 👤 | Ready | Medium | Feature | Dev | | 2 SP | Task 4 |
| | + Add Task | | | | | | | 4 SP sum | |

> Low (87-5-30)
No Tasks

| | | Status | Priority | Type | Role | | Estimated SP ⓘ | |
|---|---|---|---|---|---|---|---|---|
| | | | | | | | 0 SP sum | |

∨ Blank (87-5-40)

| | Task | Owner | Status | Priority | Type | Role | Task Description | Estimated SP ⓘ | Dependent On ⓘ |
|---|---|---|---|---|---|---|---|---|---|
| ☐ | Task 1 | ⊕ | | | | | Feature 1 | | |
| ☐ | Task 2 | ⊕ | | | | | | | |
| | + Add Task | | | | | | | 0 SP sum | |

DIGITAL PROCESSING SYSTEMS AND METHODS FOR MANAGING SPRINTS USING LINKED ELECTRONIC BOARDS

The present disclosure relates to systems and methods for collaborative work systems. More particularly, disclosed systems and methods provide improvements in collaborative software development systems, providing controls for organizing and visualizing data in one or more databases.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

Software development often involves different methodologies or frameworks depending on the use case and needs of the software product. Scrums and other project management techniques may assist in managing software development and completion of features within a project. Agile methods of management may include scrums, or iterative, incremental frameworks for developing and sustaining products. Software development may include sprints to manage work for development teams. Sprints, which may be an iterative timeframe for development, may be used across a variety of tasks or goals for a project or multiple projects. As such, it may be beneficial to utilize tools to track and assist teams with tasks and sprints.

In some examples, data boards or tables may contain various information regarding software development, including data about tasks and sprints of a project. Sometimes, such boards and tables may be difficult to set up for use with sprints because, for example, data may be presented in a manner which may not capture all the details of the statuses of sprints. Software sprints may be difficult to scale and manage a complex variety of tasks and sprints across projects. For example, users of a software management tool may experience difficulty in building a sprint framework. The sprint framework may not display sprint data in an efficient or effective manner. Difficulty in associating tasks and project data with different sprints may lead to overcomplicated boards that may be difficult for a user to operate. Improvements in sprint management tools are desirable to address these technical drawbacks.

SUMMARY

Consistent with disclosed embodiments, systems, methods, and computer readable media for performing operations for managing a plurality of sprints using a plurality of electronically linked boards. The at least one processor may perform operations comprising generating a low-level board with rows and columns, the rows and columns for containing sprint-related function data associated with the plurality of sprints. The at least one processor may perform operations comprising generating at least one internal column and at least one external column on the low-level board, the at least one external column for containing links to at least one associated high-level board. The at least one processor may perform operations comprising presenting an activatable internal group-by control, presenting an activatable external group-by control, receiving a first indication of activation of the internal group-by control, and in response to the first indication, organizing rows on the low-level board into first groups based on common internal column data. The at least one processor may perform operations comprising receiving a second indication of activation of the external group-by control, and in response to the second indication, reorganizing rows on the low-level board into second groups by common external column data, accessing on the low-level board, the links to the at least one associated high-level board, extracting data from the at least one associated high-level board, and importing the extracted data onto the low-level board.

Consistent with disclosed embodiments, systems, methods, and computer readable media for managing at least one task across a plurality of workflow management boards based on electronic data value changes across the plurality of workflow management boards are disclosed. The method may comprise generating a low-level board with rows and columns, the rows and columns for containing sprint-related function data associated with a plurality of sprints. The method may comprise generating at least one internal column and at least one external column on the low-level board, the at least one external column for containing links to at least one associated high-level board. The method may comprise presenting an activatable internal group-by control, presenting an activatable external group-by control, receiving a first indication of activation of the internal group-by control, and in response to the first indication, organizing rows on the low-level board into first groups based on common internal column data. The method may comprise receiving a second indication of activation of the external group-by control, and, in response to the second indication, reorganizing rows on the low-level board into second groups by, common external column data, accessing on the low-level board, the links to the at least one associated high-level board, extracting data from the at least one associated high-level board, and importing the extracted data onto the low-level board.

Consistent with disclosed embodiments, systems, methods, and computer readable media for managing at least one task across a plurality of workflow management boards based on electronic data value changes across the plurality of workflow management boards are disclosed. Systems, methods, devices, and non-transitory computer readable media may comprise at least one processor. The at least one processor may be configured to generate a low level board with rows and columns, the rows and columns for containing sprint-related function data associated with a plurality of sprints. The at least one processor may be configured to generate at least one internal column and at least one external column on the low-level board, the at least one external column for containing links to at least one associated high-level board. The at least one processor may be configured to present an activatable internal group-by control, present an activatable external group-by control, receive a first indication of activation of the internal group-by control, in response to the first indication, organize rows on the low-level board into first groups based on common internal column data. The at least one processor may be configured to receive a second indication of activation of the external group-by control, and in response to the second indication, reorganize rows on the low-level board into second groups by common external column data, access on the low-level board, the links to the at least one associated high-level board, extract data from the at least one associated high-level board, and, import the extracted data onto the low-level board.

BRIEF DESCRIPTION OF THE DRAWINGS

FIG. 87-2 illustrates an example of a low-level board, consistent with some disclosed embodiments.

FIG. 87-3 illustrates an example of a high-level board, consistent with some disclosed embodiments.

FIG. 87-4 illustrates an example of a group-by control, consistent with some disclosed embodiments.

FIG. 87-5 illustrates an example of a low-level board, consistent with some disclosed embodiments.

FIG. 87-6 illustrates an example of a low-level board, consistent with some disclosed embodiments.

FIG. 87-7 is a block diagram of an exemplary computing device which may be employed in connection with disclosed embodiments.

FIG. 87-8 is a block diagram of an exemplary computing architecture for collaborative work systems, consistent with disclosed embodiments.

FIG. 87-9 illustrates an example of an electronic collaborative word processing document, consistent with disclosed embodiments.

DETAILED DESCRIPTION

Figures 1, 87:
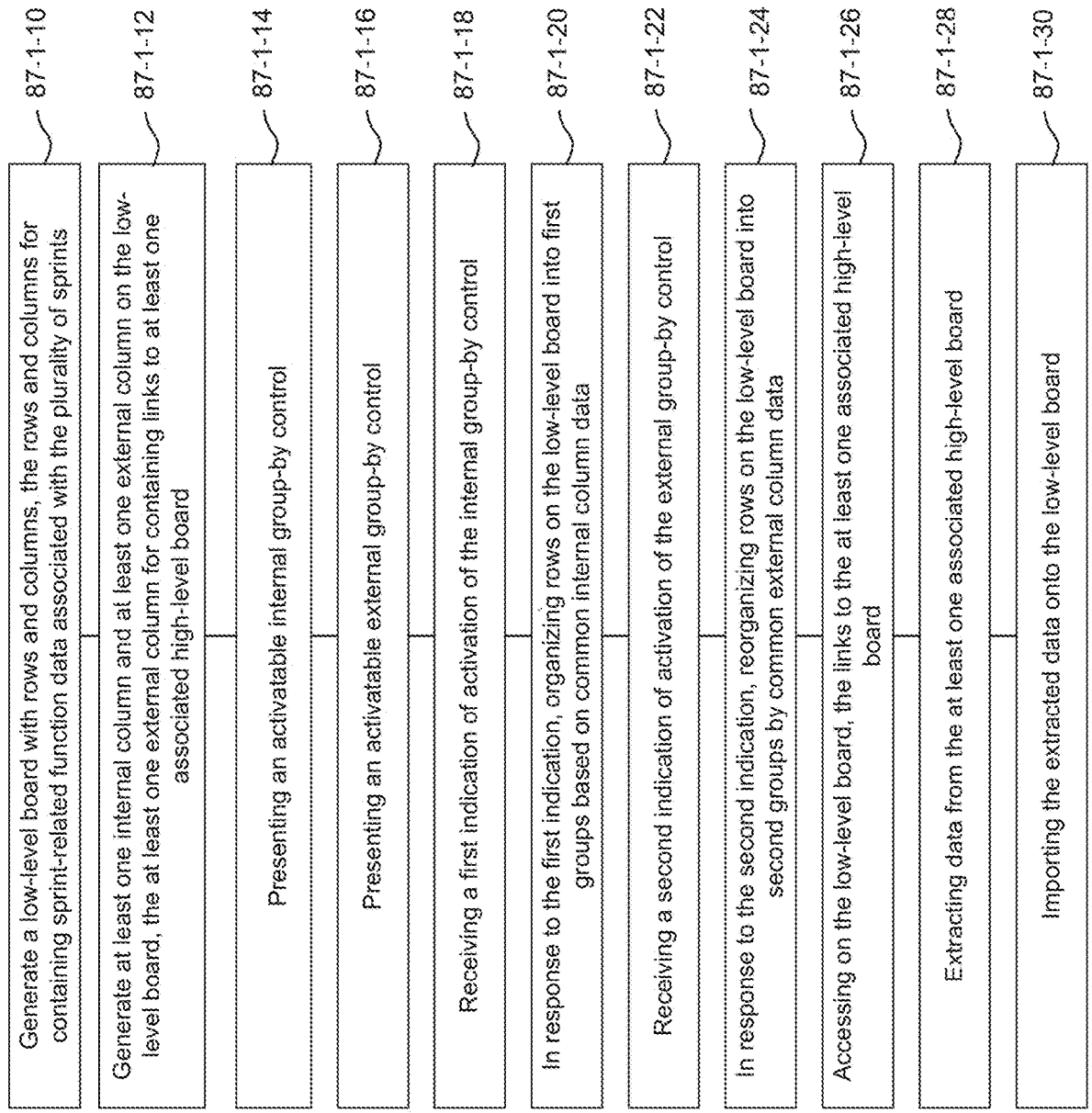
FIG. 87-1 is a flowchart of an exemplary workflow method for managing a plurality of sprints, consistent with disclosed embodiments.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the, functionality of some embodiments is described herein solely in connection with a processor or at least one processor. It is to be understood that such exemplary descriptions of functionality apply equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board, Sub-boards may be tables with sub-items that may be related to the items of a board, Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed, such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any, type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a hoard, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple hoards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. it is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storageAccordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor rimy, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In sonic embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, therein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary conte is may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may, comprise an inference model, such as a predictive model, a classification model, a regression model, a clustering model, a segmentation model, an artificial neural network (such as a deep neural network, a convolutional neural network, a recursive neural network, etc,), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Disclosed embodiments may involve managing a plurality of sprints using a plurality of electronically linked boards. A sprints may relate to a portion of development of a computer software, or a time period during which one or more individuals may work to develop or complete an improvement or addition to a system, computer program, software application, or other item. In some embodiments, a sprint may include strategies, plans, methods, or procedures for designating time frames, periods, or intervals for developing a product, solution, or service. For example, sprints may include strategies for issue management, team management, task management, scrums, frameworks, workflows, agile development, scrums, product development, software development, project management, product management, or any other planning method for software development, programming, application development, engineering. For example, sprints may include management strategies for achieving goals in designated time periods to develop a software product. In some embodiments, sprints may involve a series of iterations to separate a project or product into subcomponents of the project or product. For example, a sprint may include a management strategy to complete a product in a specific amount of time. In some embodiments, a sprint may include strategies for developing software within a specific, short, fixed-length time period. A skilled artisan may recognize that a sprint may involve iterations of planning, backlogs, scrum, review, user stories, or burn down charts. In some embodiments, a plurality of sprints may include at least one sprint occurring in series or parallel. Electronically linked boards may include boards, as described herein, which may connect, mirror, transmit, copy, relay, refer, share, or communicate data, inputs, outputs, features, details, or any other form of information. In some embodiments, electronically linked boards may share information between one or more boards. For example, data in rows and columns of a board may be shared with at least one other board. In some embodiments, stored data or metadata may identify one or more links between rows, columns, and/or cells of a high level board and a low level board. Disclosed embodiments may involve electronic data value changes across a plurality of workflow management boards. Workflow management may include infrastructure for setup, performance and monitoring for a sequence of tasks, a series of steps to complete a specific task, organizing tasks, streamlining processes, routing, distribution, coordination, agile systems, lean systems, scrum systems, waterfall systems, Kanban systems, or adaptive systems. Electronic data value changes may include changes, alterations, transitions, or transformations in values of data or information.

Disclosed embodiments may involve managing time-sensitive tasks using electronically linked boards. Time-sensitive tasks may not be limited to sprints, as discussed herein. Time-sensitive tasks may include assignments with a dependency on time, such as timed projects, timed assignments, tasks classified by priority, iterative tasks, or periodical tasks. Disclosed embodiments may involve linking or connecting data and information regarding time-sensitive tasks between one or more boards. In some embodiments, time-sensitive data may be contained in columns external to a board. In some embodiments, time-sensitive task data may be contained in a high-level board. In some embodiments, a low-level board may be linked to at least one high-level board, and data associated with one or more time-sensitive tasks may be imported from one board to another. In some embodiments, linking boards and importing data may be performed in response to an indication of activation of one or more group-by controls.

Disclosed embodiments may involve generating a low-level board with rows and columns, the rows and columns for containing sprint-related function data associated with the plurality of sprints. In some embodiments, generating a board may include presenting or displaying at least one board including a low-level board. A low-level board may include at least one board containing, displaying, sharing, or presenting, information regarding project, product, or software development. A low-level board may include groupings of information presented in rows and columns of tables, as described herein. In some embodiments, a low-level board may contain rows and columns containing sprint-related function data. Sprint-related function data may include information or data such as to sprints, scrums, team members, tasks, persons, dates, issues, timelines, deadlines, goals, sprint summaries, statuses, progress, activity, or any other details regarding management of software development. For example, sprint-related function data may include features, tasks, owners, statuses, priorities, descriptions, due dates, timelines, bugs, roles, and other datum points.

In some embodiments, a low-level board may contain data corresponding to one or more tasks of a project, such as a software development project. A low-level board may be organized by project or specific tasks. Different tasks may be aggregated together and displayed on a table or board, such as a low-level board. In some embodiments, different low-level boards may contain information corresponding to different projects. For example, smaller projects within a larger a software development may each have a corresponding low-level board.

Figures 2, 87:
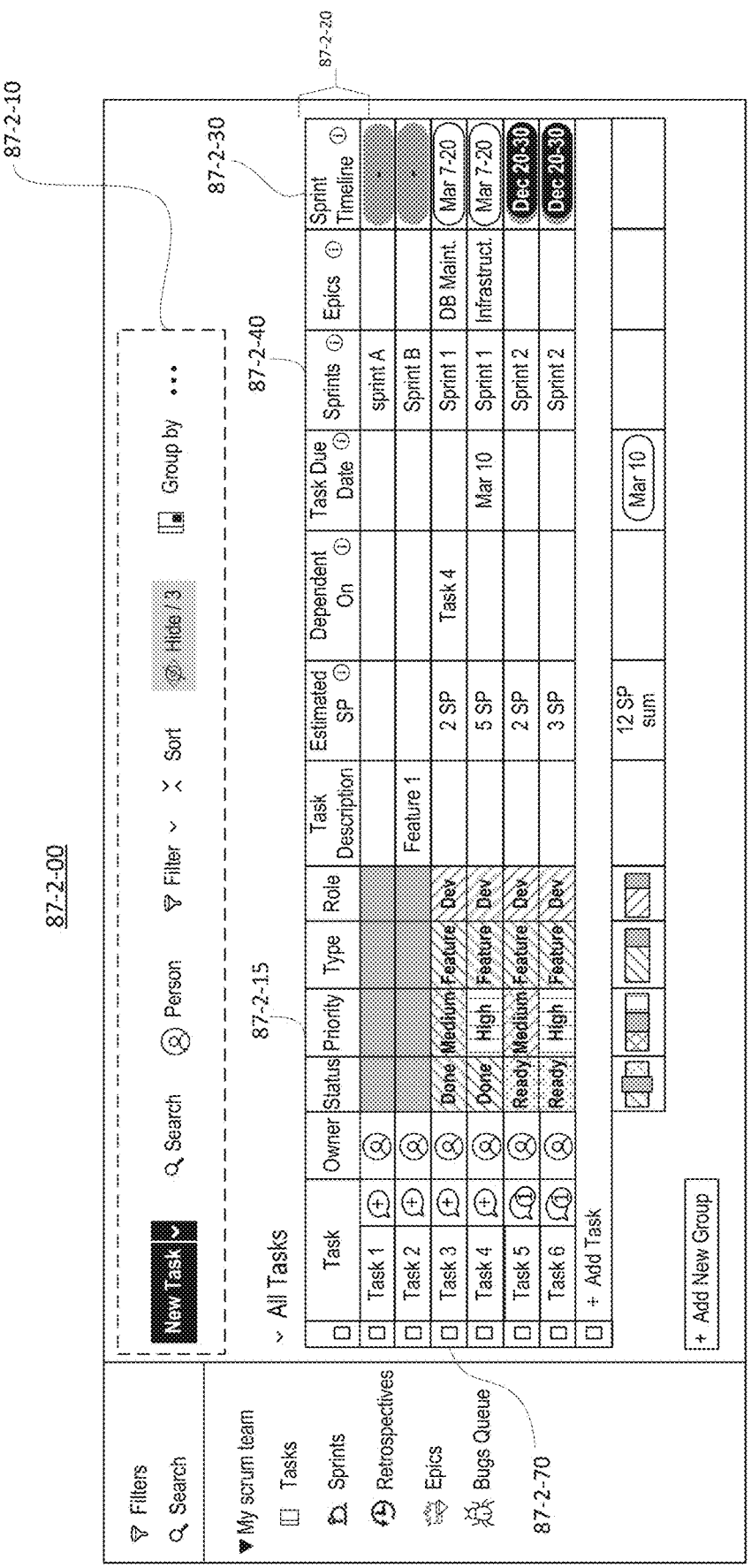

FIG. 87-2 is an example configuration of a low-level board, consistent with disclosed embodiments. In some embodiments, a low-level board may include controls to filter, sort, arrange, or organize sprint-related function data. For example, low-level board 87-2-00 may include board controls 87-2-10. Low-level board 87-2-00 may include sprint-level function data, as described herein. For example, low-level board 87-2-00 may include column headings 87-2-20. Column headings 87-2-20 may correspond include sprint-level function data, including owner, status, priority, type, role, task description, story points, dependencies, due dates, sprint names, epics, and timelines. In some embodiments, a low-level board may include multiple, distinct tables comprising rows and columns.

In some embodiments, at least one processor may generate at least one internal column and at least one external column on the low-level board. An internal column may include sets, categories, classifications, or other arrangements of storing information as described herein. In some embodiments, an internal column may include information or data collected, originating, or obtained from the same board or table the column exists in. In some embodiments, an internal column may contain data related to specific tasks of a project. For example, an internal column may contain information inputted directly into the cells of the column on the low-level board. In some embodiments, an internal column may not access data contained within boards different than the board the internal column exists in. An internal column may contain sprint-related function data. In some embodiments, an external column may include information or data collected, originating, or obtained from a board or table different from the board the column exists in. In some embodiments, an external column may access data contained within other boards or tables. For example, an external column may present data or information that is extracted from another board. In some embodiments, internal columns and external columns may, include blank values or cells with no value.

FIG. 87-2 is an example configuration of a low-level board, consistent with disclosed embodiments. Low-level board 87-2-00 may include a variety of rows and columns, such as internal columns and external columns. As described herein, internal columns may contain information corresponding to the presented board. For example, internal column 87-2-15 may contain information or data related to a task description, including task status, priority, type, description, and role. In some embodiments, low-level board 87-2-00 may include external columns 87-2-30 which may include descriptions of sprints including labels, indications, tags, markers, and notes. Information may be directly inputted into cells in internal column 87-2-15 such that changes to cells of internal column 87-2-15 may be reflected on the low-level board 87-2-00. Low-level board 87-2-00 may include external column 87-2-40. External column 87-2-40 may contain data extracted from, shared, mirrored, or collected from a board separate to the low-level board 87-2-00 which it is displayed on. In some embodiments, cells of external column 87-2-40 may not be directly manipulated on low-level board 87-2-00. External columns 87-2-40 may be identified as an external column by specific indication or markings.

In some embodiments, at least one external column may link to at least one associated high-level board. In some embodiments, links may include connections between electronically linked boards, as described herein. Links may include forms of data sharing including communication and mirroring. For example, links may include connecting or communication between boards to mirror information such that data contained on one board is displayed on another board. A high-level board may include at least one board containing, displaying, sharing, or presenting information regarding project, product, or software development, or sprints. The high-level board may be organized differently than the low-level board. In some embodiments, the high-level board may organize or display information or data based on categories. In some embodiments, a high-level board may track, audit, monitor, or observe a project. For example, a high-level board may track a project across one or more sprints. The high-level board may contain high-level data or information regarding the project it tracks, including metadata. In some embodiments, an associated high-level board may correspond to data or information contained in a low-level board. In some embodiments, a low-level board may correspond to one or more high-level boards. For example, different groups of data contained in a low-level board may associate with different high-level boards.

Disclosed embodiments may involve each row of a plurality of rows on the at least one associated high-level board being configured to hold data associated with a specific sprint. A specific sprint may include sprints with different names, different goals, or different sprint data. As discussed herein, the high-level board may include a plurality of rows and columns. In some embodiments, each row in the high-level board may hold or contain data associated with different sprints. As an example, in high-level board 87-3-00, rows 87-3-40 include a plurality of rows each holding data associated with a different sprint. In some embodiments, the at least one associated high-level board may be configured to hold sprint backlog data or metadata. The high-level board may include sprint metadata, sprint name, sprint duration, sprint goals, risk, effort, uncertainty, task progress, backlog, bugs, activity status, and other indications or metadata. Sprint backlog data may include tasks, items, issues, bugs, or other work intended to be completed during a specific sprint. Metadata may include descriptions of other data including structure, identity, attributes, context, features, administration, or reference information. Metadata may include sets of data describing or giving information about other data or information. For example, metadata may describe information about a sprint, such as sprint name, duration, goals, risk, effort required, work complexity, uncertainty, dates, progress, tasks, backlogs, bugs, or status. In some embodiments, metadata may comprise sprint metadata including data associated with one or more attributes about a sprint.

Figures 3, 87:
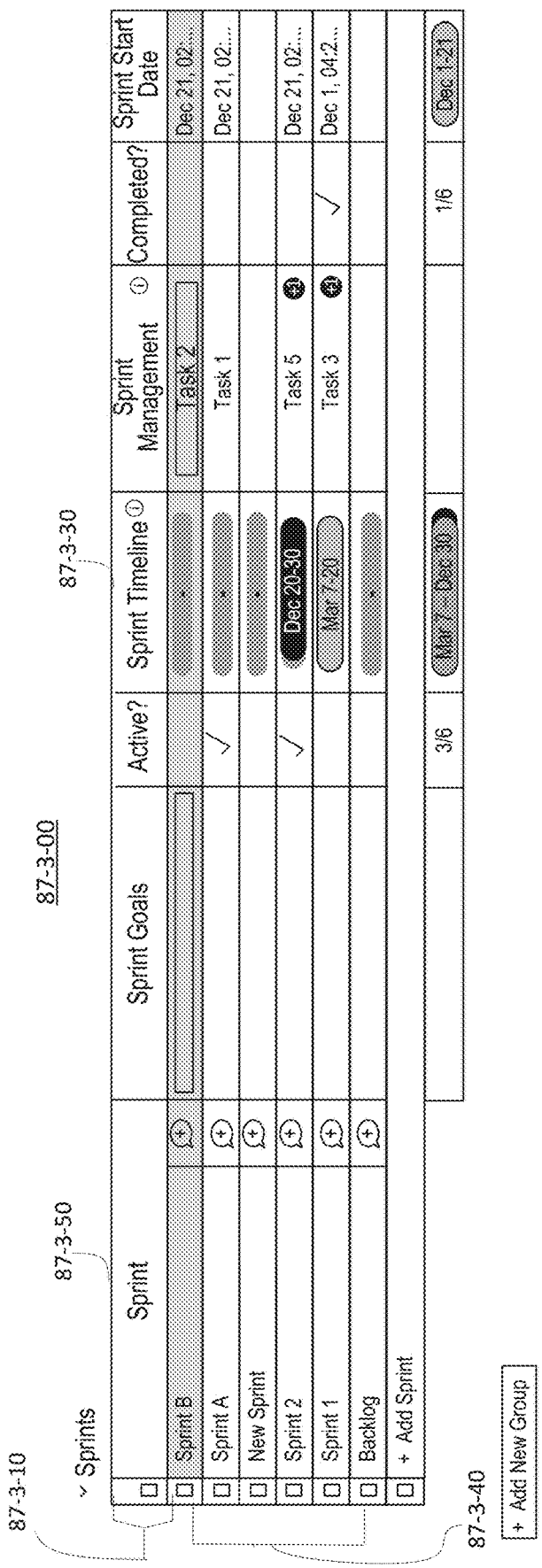

FIG. 87-3 is an example configuration of a high-level board, consistent with disclosed embodiments. High-level board 87-3-00 may include columns 87-3-10. High-level board 87-3-00 may contain or hold sprint backlog data or metadata within cells of rows and columns 87-3-111 In some embodiments, columns 87-3-10 may have headings corresponding to sprint-related function data or sprint metadata including, for example, sprint name, goals, activity status, and timeline. External column 87-2-30 on low-level board 87-2-00 may contain links to associated high-level board 87-3-00. For example, external column 87-3-30 on high-level board 87-3-00 may be linked to external column 87-2-30. In some embodiments, rows 87-3-40 on high-level board 87-3-00 may include a plurality of rows which may hold data associated with a specific sprint from name column 87-3-50.

In some embodiments, at least one processor may cause one or more displays to present an activatable internal group-by control. Activatable controls may include controls, triggers, switches, mechanisms, buttons, drop-downs, or other actuators for interacting with a board, dashboard, or other software configuration. Group-by controls may include a function or capability for sorting, arranging, categorizing, classifying, reorganizing, ordering, combining, or other organizing of information or data into sets, groups, or other divisions. Internal group-by controls may include organizing information based on information that is internal to the board. As discussed herein, internal may include information local to, directly inputted into, or accessible to a board. Disclosed embodiments may involve presenting an activatable external group-by control. External group-by controls may include organizing information based on information that is external to the board. As discussed herein, external may include information or data collected, originating, or obtained from a board or table different from the board the control is presented on.

Figures 4, 87:
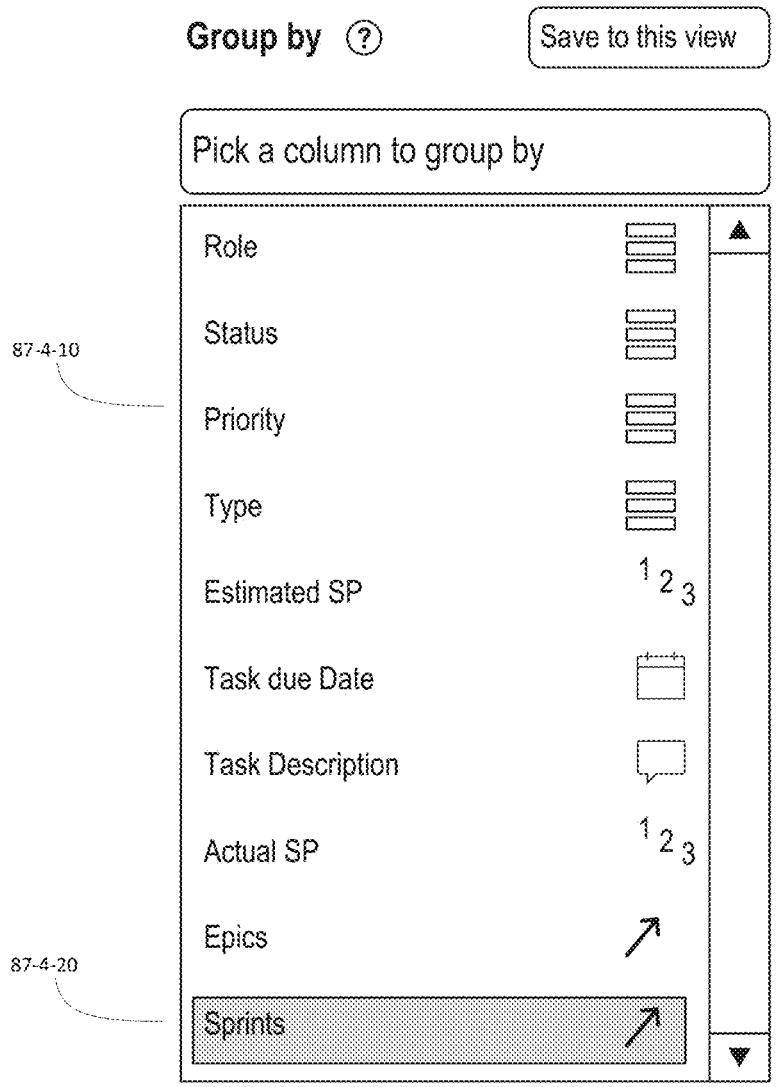

FIG. 87-4 is an example configuration of a group-by control, consistent with disclosed embodiments. Group-by control 87-4-00 may include one or more activatable controls that may be interactable. For example, group-by control 87-4-00 may include a drop-down menu with activatable internal group-by controls 87-4-10 and activatable external group-by controls 87-4-20. Activatable internal group-by controls 87-4-10 or activatable external group-by controls 87-4-20 may be selected, clicked, or pressed. As an example, activatable internal group-by controls may include roles, statuses, priorities, or types. As an example, activatable external group-by controls may include tasks due dates, descriptions, epics, and sprint names. In some embodiments, group-by controls may be accessed on a board. For example, board controls 87-2-10 on low-level board 87-2-00 (as referenced in FIG. 87-2) may present a configuration to access group-by controls.

In some embodiments, at least one processor may receive a first indication of activation of the internal group-by control. In some embodiments, an indication of activation may include a mouse click, press, gesture, or other feedback cue confirming a selection of an option. In some embodiments, an indication of activation may include a response of a change in configuration of a board. For example, a first indication of activation of an internal group-by column may involve selecting a criteria, rule, basis, standard, or grouping, such as internal data. In some embodiments, group-by control 87-4-00 may present options including selecting internal group-by controls 87-4-10. For example, receiving a first indication of activation may include selecting internal group-by controls 87-4-10 as a grouping basis. In some embodiments, the basis for grouping may depend on the internal column chosen.

In some embodiments in response to the first indication, at least one processor may organize rows on the low-level board into first groups based on common internal column data. Common internal column data may include data, values, entries, inputs or information contained in cells of internal columns. In some embodiments, common internal column data may comprise data values in a cell of internal columns with a value equivalent to one or more other data values in the same internal column. For example, an internal column may contain a set of data, and within the set, there may be at least one group of equivalent data such that one or more values are equivalent to each other, and each such group may be regarded as common internal data. The common internal data may serve as a basis to organize rows on the low-level board. In some embodiments, each set of equivalent data may represent a category, classification, or group to organize rows. Organizing rows may include arranging, grouping, ordering, assembling, structuring, or otherwise sorting rows of a board or table. For example, after receiving an indication of activation, rows may be organized on a low-level board according to first groups determined b common internal column data from a certain internal column groups may include a first classification of rows on the board.

FIG. 87-5 is an example configuration of groups of a low-level board, consistent with disclosed embodiments. For example, a low-level board may appear in the configuration of low-level board 87-2-00, as referenced in FIG. 87-2. Low-level board 87-2-00 may include internal column 87-2-15. Internal column 87-2-15 may have a column header which may comprise a set or classification of information related to tasks, including task priority, Task priority may include various values such as high priority, medium priority, and low priority, or blank cells. Internal column 87-2-15 may include common internal column data. For example, cells of internal column 87-2-15 include one or more values with equivalent values such as high priority, low priority, or medium priority, and the equivalent values may represent common internal column data. A first indication of activation of an internal group-by control may be selected, and in response to the first indication, rows on the low-level board 87-2-00 may be organized into first groups. For example, the low-level board 87-2-00 may be organized into first groups on low-level board 87-5-00, as referenced on FIG. 87-5. In some embodiments, the board may be organized into groups based on common internal column data such that each unique entry in the internal column creates a group header in the organized low-level board. Low-level board 87-5-00 may include first groups based on the internal column data of internal column 87-2-15, including groupings of high priority 87-5-10, medium priority 87-5-20, low priority 87-5-30, and blank 87-5-40. Individual cells within internal column 87-2-15 may be associated with a row. In some embodiments, organizing rows on the low-level board may include mapping such rows into first groups of low-level board 87-5-00. For example, low-level board 87-2-00 (FIG. 87-2) may include rows with data values in internal column 87-2-5 corresponding to a medium priority, such as the rows corresponding to task 3 87-2-70 or task 5. Upon organizing, these corresponding rows may be sorted in low-level board 87-5-00 (FIG. 87-5) in a first group of medium priority 87-5-20. In this example, the corresponding rows are now configured as task 3 87-5-70 and task 5 contained within the first group of medium priority 87-5-20.

Disclosed embodiments may involve receiving a second indication of activation of the external group-by control. In some embodiments, a second indication of activation of an external group-by column may involve selecting a criteria, rule, basis, standard, or grouping, such as external data. In some embodiments, group—by control 87-4-00 may present options including selecting external group-by controls 87-4-20. For example, receiving a second indication of activation may include selecting external group-by controls 87-4-10 as a grouping basis. In some embodiments, the basis for grouping may depend on the external column chosen.

In some embodiments in response to the second indication, at least one processor may reorganize rows on the low-level board into second groups based on common external column data. Common external column data may include data, values, entries, or information contained in cells of external columns. Common external common data may include data mirrored or linked from columns from other boards. In some embodiments, common external column data may comprise data values in a cell of external columns with a value equivalent to one or more other data values in the same external column. For example, an external column may contain a set of data, and within the set, there may be at least one group of equivalent data such that one or more values are equivalent to each other, and each such group may be regarded as common external data. The common external data may serve as a basis to reorganize rows on the low-level board. In some embodiments, each set of equivalent data may represent a category, classification, or group to organize rows. Reorganizing rows may include a new arrangement, grouping, ordering, assembling, structuring, or otherwise sorting of rows of a board or table. In some embodiments, reorganizing rows may include maintaining the same arrangement of one or more rows in the board. For example, after receiving an indication of activation, rows may be reorganized on a low-level board according to second groups determined by common external column data from a specific external column. Second groups may include a second classification of rows on the board. In some embodiments, the second classification may be the same as the first classification.

In some embodiments, in response to selection of an external group-by, a board may be reorganized by common external column data into second groups such that each second group may be a new heading determined by the common external column data. External data may be extracted from associated boards via the external columns, and the external data may be presented in the associated second group. In some embodiments, boards may be grouped by a relationship with another board.

In some embodiments, the external group-by control and internal group-by control may be configured for simultaneous reorganization of one or more rows on the low-level board, based on common internal column data and common external column data. Simultaneous performance may involve one or more processes or actions occurring in a similar time frame, caused by a common trigger, or executed on the same board. For example, the external group-by control and internal group-by control may be configured to simultaneously group a board based on one or more rule sets or predetermined settings.

Figures 6, 87:
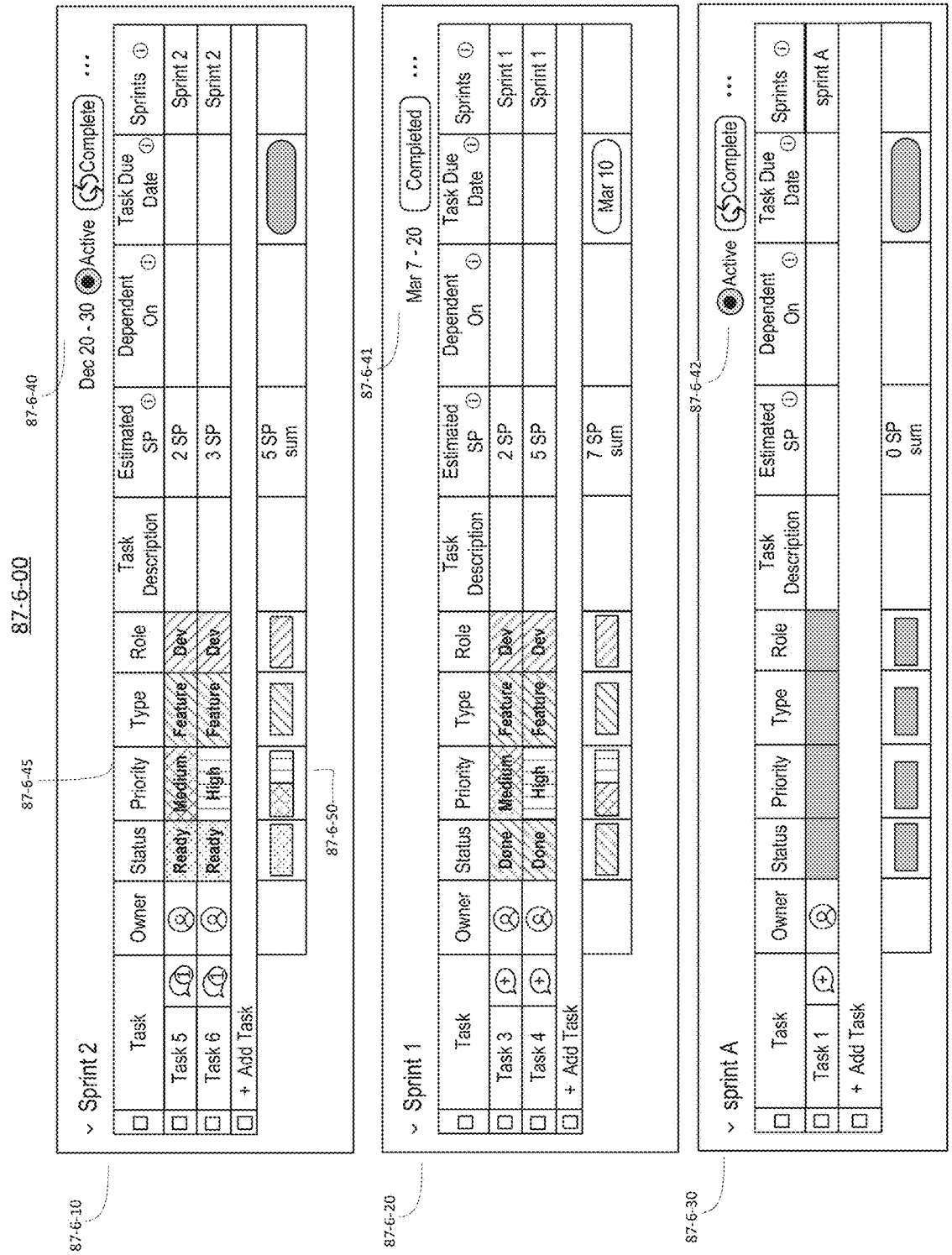

FIG. 87-6 is an example configuration of groups of a low-level board, consistent with disclosed embodiments. For example, a low-level board may appear in the configuration of low-level board 87-2-00, as referenced in FIG. 87-2. Low-level board 87-2-00 may include external column 87-2-40. External column 87-2-40 may have a column header which may comprise a set or classification of information related to sprints, including sprint name or sprint timeline. Sprint names may include names or labels corresponding to one or more sprints of a project. External column 87-2-40 may include common external column data. For example, cells of external column 87-2-40 may include one or more values with equivalent values such as shared sprint names, and the equivalent values may represent common external column data. A second indication of activation of an external group-by control may be selected, and in response to the second indication, rows on the low-level board 87-2-00 may be reorganized into second groups. For example, the low-level board 87-2-00 may be reorganized into second groups on low-level board 87-6-00, as referenced on FIG. 87-6. In some embodiments, the board may be reorganized into groups based on common external column data such that each unique entry in the external column creates a group header in the reorganized low-level board. In the example of low-level board 87-6-00, the board is grouped by an external column of sprints. Low-level board. 87-6-00 may include second groups based on the external column data of external column 87-2-40 including groupings of sprints such as sprint two 87-6-10, sprint one 87-6-20, and sprint three 87-6-30. Grouping sprint two 87-6-10 may be comprised of rows of low-level board 87-2-00 with values in external column 87-2-40 corresponding to a specific sprint, such as sprint two. In some embodiments, reorganizing rows on the low-level board may include mapping such rows into second groups of low-level board 87-6-00. Grouping sprint one 87-6-20 may be comprised of rows of low-level board 87-2-00 with values in external column 87-2-40 corresponding to a specific sprint, such as sprint one. Grouping sprint A 87-6-30 may be comprised of rows of low-level board 87-2-00 with values in external column 87-2-40 corresponding to a specific sprint, such as sprint A.

In some embodiments, data associated with a specific sprint may be linked to the specific sprint via at least one external column. For example, sprint data may be contained in high-level board 87-3-00. In some embodiments, external column 87-3-30 may link data from another board to high-level board 87-3-30. Such data may include sprint data such as a sprint timeline or timeframe. The sprint data linked by external column 87-3-30 may then appear in the high-level board 87-3-00. In some embodiments, the external group-by may be configured to reorganize rows on the low-level board into a plurality of groups by common external column data, access on the low-level board, the additional links to the plurality of high-level boards, extract additional data from the plurality of associated high-level boards, and import the extracted data onto the low-level board. For example, a low-level board may be associated with a plurality of high-level boards, such as at least one high-level board containing sprint data for a specific project and one or more boards containing other data regarding software development. The external group-by may provide the option to link external columns containing data from these associated high-level boards to the low-level board. Common external column data may be used to reorganize the rows on the low-level board. The additional links may be accessed, and additional data from the associated high-level boards may be extracted, and imported onto the low-level board, as discussed herein.

As discussed herein, internal columns and external columns may also be comprised of linkage columns. Linkage columns may include columns within a board that may link the board with at least one other board. Linkage columns may connect, mirror, transmit, copy, relay, refer, share, or communicate data, inputs, outputs, features, details, or any other form of information between the one or more columns of the board. Disclosed embodiments may involve at least one external column being a linkage column. In some embodiments, the low-level board may include a plurality of linkage columns. A plurality of linkage columns may involve one or more linkage columns in the same board, which may link to one or more linkage columns in one or more separate boards. In some embodiments, each of the plurality of linkage columns may contain additional links to each of a plurality of associated high-level boards. As discussed herein, a board such as a low-level board may be connected to a plurality of associated high-level boards, which may comprise at least one high-level board. In some embodiments, additional links may comprise one or more links to a column of another board. For example, additional links on a low-level board may link to one or more linkage columns on at least one high-level board.

In some embodiments, at least one processor may access, on the low-level board, the links to the at least one associated high-level board. Accessing may include acquiring, reading, obtaining, connecting, locating, gathering, or transferring links, data, information, or values. In some embodiments, accessing links may include obtaining the rows or columns of a board or table. For example, accessing links may include obtaining the rows or columns of one or more high-level boards associated with a low-level board. In some embodiments, the at least one processor may extract data from the at least one associated high-level board. Extracting data may include retrieving, pulling out, capturing, restoring, or mirroring data, information, values, or metadata from a different board. In some embodiments, data may be extracted from multiple boards, such as multiple high-level boards. Disclosed embodiments may involve importing the extracted data onto the low-level board. Importing may involve bringing in, pulling in, conveying, transporting, moving, transferring, relaying, inserting, presenting, mirroring, copying displaying, or otherwise transmitting data or information. In some embodiments, importing extracted data may include transmitting information contained in one board to another. For example, importing extracted data may include pulling in data contained in a high-level board to a low-level board. In some embodiments, importing may include displaying the transmitted information or data. For example, importing extracted data may include copying data from one or more rows of columns of a table or board and presenting the copied data in another board.

As an example, low-level board 87-6-00 is an exemplary configuration of a low-level board containing imported extracted data. Low-level board may be associated with high-level board 87-3-00 (FIG. 87-3). Extracted data may include metadata, sprint metadata, and data contained within columns of high-level board 87-3-00. For example, low-level board 87-6-00 may be grouped by sprints. External column 87-3-50 may be a basis or may be considered a rule for grouping, and groups in associated low-level board 87-6-00 may be reorganized by the categories of the names of the sprints. In some embodiments, external or imported data may be marked or labeled. In some embodiments, the extracted data may be imported and presented on the low-level board 87-6-00. For an example of grouping by sprints, activity and sprint timeline may be extracted from high-level board 87-3-00 and imported into low-level board 87-6-00, The imported data may include metadata presented on the low-level board, such as imported metadata 87-6-40. In some embodiments, at least some of the imported extracted data may be presented in each of the groups in the low-level board. For example, the corresponding sprint metadata extracted from each row in high-level board 87-3-00 may be presented as metadata 87-6-40, 87-6-41, 87-6-42 on each group in the low-level board 87-6-00. In some embodiments, each group in a reorganized low-level board may contain imported data.

In some embodiments, at least one processor may aggregate data from the items of the low-level board that are linked to. Low-level boards that are linked to may include boards that are linked to a column, row, cell, or other data value in a high-level board. Aggregation of data may include combining, collecting, mixing, summing, or processing data. Aggregation of data may include combining different sets, pieces, or values of data into one or more different sets of data. In some embodiments, aggregation of data may include processing different values of data and presenting them on a board as a different set of data or a summary of the data. For example, a low-level board linked to a high-level board corresponding to sprint data may have data aggregated. The data may be processed and presented on the low-level board. As an example, low-level board 87-6-00 may be grouped by sprints, and include priority data 87-6—45 regarding different tasks within the grouping of sprint two 87-6-10. Data aggregation may combine the different priority data from tasks within sprint two grouping 87-6-10, and combine the priority data and present it as aggregated data 87-6-50. In some embodiments, aggregated data 87-6-50 may be presented as a battery widget or pie chart, providing a summary or overview of the different values of priority data within the grouping.

In some embodiments, linkage between different boards, such as a low-level board and a high—level board, may be utilized for timed assignments, iterative projects, or projects with deadlines or specified timeframes. Timeframe data may be contained in a high-level board, and may be imported and presented on a low-level board.

In some embodiments, the imported data may influence one or more of a sorting or an arrangement of items in at least one group of the low-level board. Influencing may involve causing, determining, affecting, effecting, modifying, impacting, or inducing. In some embodiments, the imported data may influence a sorting or arrangement of items by determining the classification or categorization of data within the low-level board. For example, imported data such as sprint name may cause the low-level board to by categorized by names of the sprints.

Figures 7, 87:
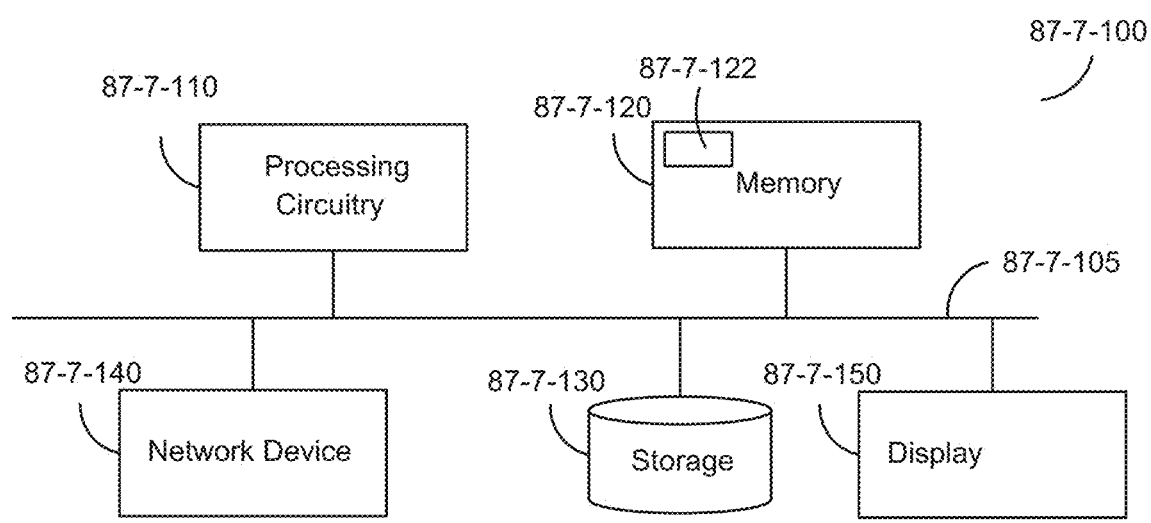

FIG. 87-1 illustrates a flowchart of an exemplary computer-based process for a workflow for managing sprints. FIG. 87-1 includes steps 87-1-10 to 87-1-30. In some embodiments, the process may be implementing using at least one processor of computing device 87-7-100 or user device 87-8-220-1, discussed with respect to FIGS. 87-8 and 87-8, respectively, Referring to FIG. 87-1, at step 87-1-10, at least one processor may generate a low-level board with rows and columns, the rows and columns for containing sprint-related function data associated with a plurality of sprints. At step 87-1-12, the at least one processor may generate at least one internal column and at least one external column on the low-level board, the at least one external column for containing links to at least one associated high-level board. At step 87-1-14, the at least one processor may present an activatable internal group-by control. At step 87-1-16, the at least one processor may present an activatable external group-by control. At step 87-1-18, the at least one processor may receive a first indication of activation of the internal group-by control. At step 87-1-20, in response to the first indication, the at least one processor may organize rows on the low-level board into first groups based on common internal column data. At step 87-1-22, the at least one processor may receive a second indication of activation of the external group-by control. At step 87-1-24, in response to the second indication, the at least one processor may reorganize rows on the low-level board into second groups by common external column data. At step 87-1-26, the at least one processor may access on the low-level board, the links to the at least one associated high-level board. At step 87-1-28, the at least one processor may extract data from the at least one associated high-level board. At step 87-1-30, the at least one processor may import the extracted data onto the low-level board, FIG. 87-7 is a block diagram of an exemplary computing device 87-7-00 for generating a column and/or row oriented data structure repository for data consistent with some embodiments. The computing device 87-7-100 may include processing circuitry 87-7-110, such as, for example, a central processing unit (CPU). In some embodiments, the processing circuitry 87-7-110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry such as processing circuitry 87-7-110 may be coupled via a bus 87-7-105 to a memory 120.

The memory 87-7-120 may further include a memory portion 87-7-122 that may contain instructions that when executed by the processing circuitry 87-7-110, may perform the method described in more detail herein. The memory 87-7-120 may be further used as a working scratch pad for the processing circuitry 87-7-110, a temporary storage, and others, as the case may be. The memory 87-7-120 may be a volatile memory such as, but not limited to, random access memory (RAM), or non-volatile memory (NVM), such as, but not limited to, flash memory. The processing circuitry 87-7-110 may be further connected to a network device 87-7-140, such as a network interface card, for providing connectivity between the computing device 87-7-100 and a network, such as a network 87-8-210, discussed in more detail with respect to FIG. 2 below. The processing circuitry 110 may be further coupled with a storage device 130. The storage device 87-7-130 may be used for the purpose of storing single data type column-oriented data structures, data elements associated with the data structures, or any other data structures. While illustrated in FIG. 87-7 as a single device, it is to be understood that storage device 130 may include multiple devices either collocated or distributed.

Figures 8, 87:
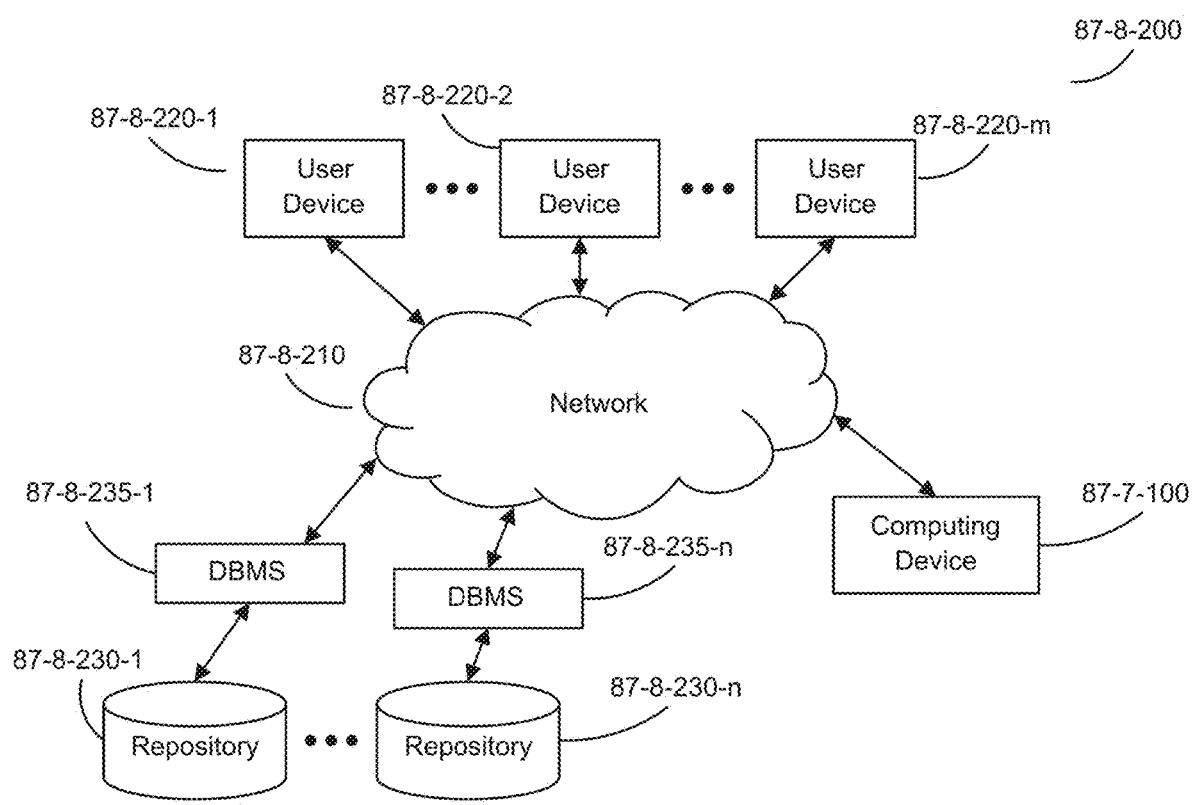

The processing circuitry 87-7-110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code), The instructions, when executed by the one or more processors, may cause the processing system to perform the various functions described in further detail herein, FIG. 87-8 is a block diagram of computing architecture 87-8-200 that may be used in connection with various disclosed embodiments. The computing device 87-7-100, as described in connection with FIG. 87-8, may be coupled to network 87-8-210. The network 87-8-210 may enable communication between different elements that may be communicatively coupled with the computing device 100, as further described below. The network 87-8-210 may include the Internet, the world-wide-web (WWW), a local area network (LAN), a wide area network (WAN), a metro area network (MAN), and other networks capable of enabling communication between the elements of the computing architecture 87-8-200. In some disclosed embodiments, the computing device 87-7-100 may be a server deployed in a cloud computing environment.

One or more user devices 87-8-220-1 through user device 87-8-220-*rn*, where 'm' in an integer equal to or greater than 1, referred to individually as user device 87-8-220 and collectively as user devices 87-8-220, may be communicatively coupled with the computing device 87-7-100 via the network 87-8-210. A user device 87-8-220 may be for example, a smart phone, a mobile phone, a laptop, a tablet computer, a wearable computing device, a personal computer (PC), a smart television and the like. A user device 87-8-220 may be configured to send to and receive from the computing device 87-7-100 data and/or metadata associated with a variety of elements associated with single data type column-oriented data structures, such as columns, rows, cells, schemas, and the like.

One or more data repositories 87-8-230-1 through data repository 87-8-230-*n*, where 'n' in an integer equal to or greater than 1, referred to individually as data repository 87-8—87-8-230 and collectively as data repository 87-8-

230, may be communicatively coupled with the computing device 87-7-100 via the network 87-8-210, or embedded within the computing device 87-7-100. Each data repository 87-8-230 may be communicatively connected to the network 87-8-210 through one or more database management services (DBMS) 87-8-235-1 through DBMS 87-8-235-n. The data repository 87-8-230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 87-7-100.

Figures 9, 87:
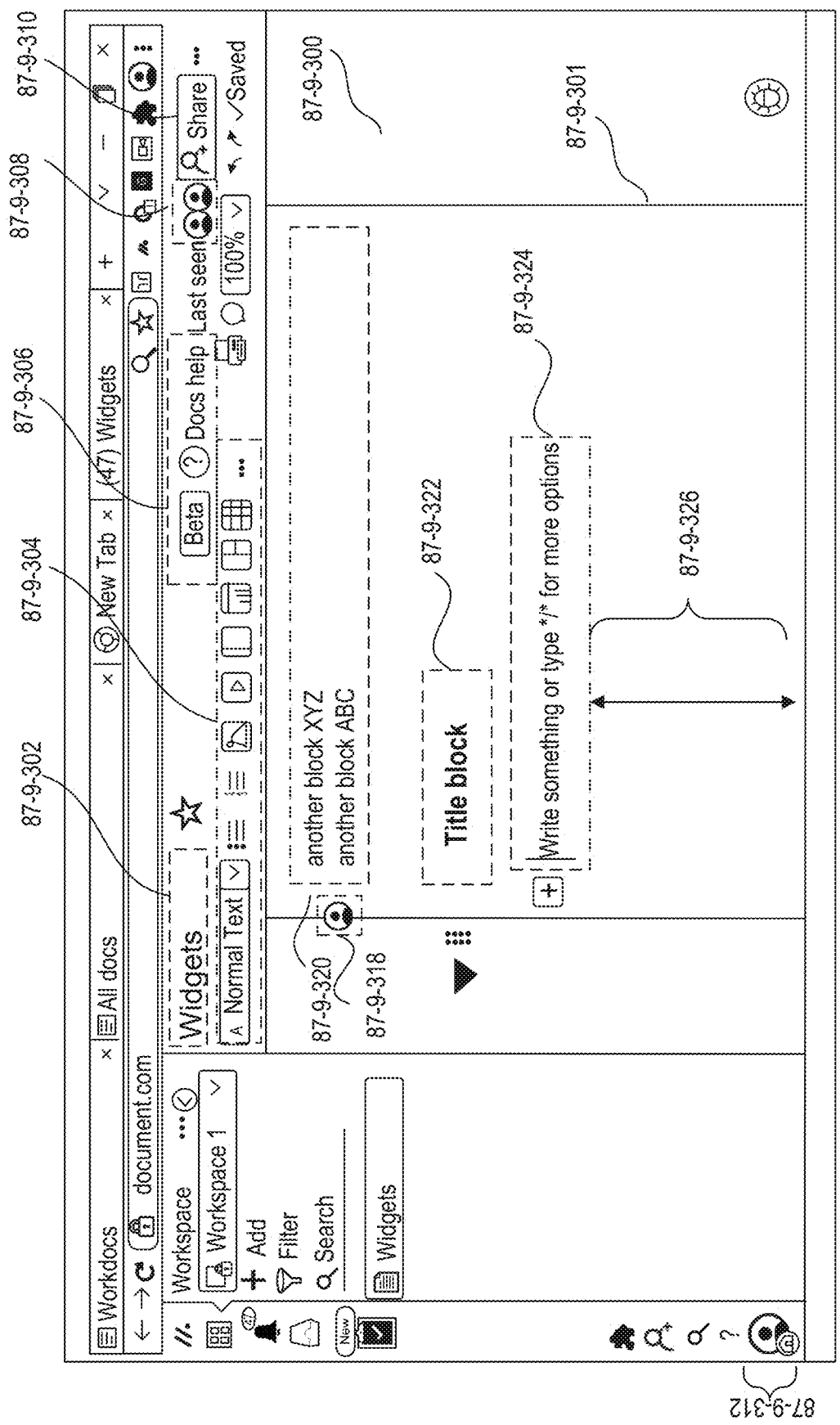

FIG. 87-9 is an exemplary embodiment of a presentation of an electronic collaborative word processing document 87-9-301 via an editing interface or editor 87-9-300. The editor 87-9-300 may include any user interface components 87-9-302 through 87-9-312 to assist with input or modification of information in an electronic collaborative word processing document 87-9-301. For example, editor 87-9-300 may include an indication of an entity 87-9-312, which may include at least one individual or group of individuals associated with an account for accessing the electronic collaborative word processing document. User interface components may provide the ability to format a title 87-9-302 of the electronic collaborative word processing document, select a view 87-9-304, perform a lookup for additional features 306, view an indication of other entities 87-9-308 accessing the electronic collaborative word processing document at a certain time (e.g., at the same time or at a recorded previous time), and configure permission access 87-9-310 to the electronic collaborative word processing document. The electronic collaborative word processing document 87-9-301 may include information that may be organized into blocks as previously discussed. For example, a block 87-9-320 may itself include one or more blocks of information. Each block may have similar or different configurations or formats according to a default or according to user preferences. For example, block 87-9-322 may be a "Title Block" configured to include text identifying a title of the document, and may also contain, embed, or otherwise link to metadata associated with the tide. A block may be pre-configured to display information in a particular format (e.g., in bold font). Other blocks in the same electronic collaborative word processing document 87-9-301, such as compound block 87-9-320 or input block 87-9-324 may be configured differently from title block 87-9-322. As a user inputs information into a block, either via input block 87-9-324 or a previously entered block, the platform may provide an indication of the entity 87-9-318 responsible for inputting or altering the information. The entity responsible for inputting or altering the information in the electronic collaborative word processing document may include any entity accessing the document, such as an author of the document or any other collaborator who has permission to access the document.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the disclosed embodiments may involve performing or completing certain selected tasks or steps manually, automatically, or a combination thereof. Moreover, according to actual instrumentation and equipment of preferred embodiments of the method and system of the disclosed embodiments, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), (I)LED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the present disclosure. Further combinations of the above features and implementations are also considered to be within the scope of some embodiments or implementations of the present disclosure.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following features alone or in combination with one or more other features, whether implemented as a method, by at least one processor, and/or stored as executable instructions on non-transitory computer-readable media: A system for managing at least one task across a plurality of workflow management boards based on electronic data value changes across the plurality of workflow management boards, the system comprising at least one processor configured to: generate a low-level board with rows and columns, the rows and columns for containing sprint-related function data associated with a plurality of sprints; generate at least one internal column and at least one external column on the low-level board, the at least one external column for containing links to at least one associated high-level board; present an activatable internal group-by control; present an activatable external group-by control; receive a first indication of activation of the internal group—by control; in response to the first indication, organize rows on the low-level board into first groups based on common internal column data; receive a second indication of activation of the external group-by control; and in response to the second indication, reorganize rows on the low-level board into second groups by common external column data. The at least one processor may access, on the low-level board, the links to the at least one associated high-level board; extract data from the at least one associated high-level board; and import the extracted data onto the low-level board.

Disclosed embodiments may include any one of the following features alone or in combination with one or more other features, whether implemented as a method, by at least one processor, and/or stored as executable instructions on non-transitory computer readable media: generating a low-level board with rows and columns, the rows and columns for containing sprint—related function data associated with the plurality of sprints; generating at least one internal column and at least one external column on the low-level board, the at least external column for containing links to at least one associated high-level board; presenting an activatable internal group-by control; presenting an activatable external group-by control; receiving a first indication of activation of the internal group-by control; in response to the first indication, organizing rows on the low-level board into first groups based on common internal column data; receiving a second indication of activation of the external group-by control; and in response to the second indication: reorganizing rows on the low-level board into second groups by common external column data; accessing on the low-level board, the links to the at least one associated high-level board; extracting data from the at least one associated high-level board; and importing the extracted data onto the low-level board.

Disclosed embodiments may include any one of the following features alone or in combination with one or more other features, whether implemented as a method, by at least one processor, and/or stored as executable instructions on non—transitory computer readable media: generating a low-level board with rows and columns, the rows and columns for containing sprint-related function data associated with the plurality of sprints; generating at least one internal linkage column on the low-level board, the at least one linkage column for containing links to at least one associated high-level board; presenting an activatable group-by control; receiving an indication of activation of the group-by control on the linkage column, and in response to the indication, reorganizing rows on the low-level board into groups by common column data; accessing on the low-level board, the links to the at least one associated high-level board; extracting data from the at least one associated high-level board; and importing the extracted data onto the low-level board.

Disclosed embodiments may include each row of a plurality of rows on the at least one associated high-level board is configured to hold data associated with a specific sprint. Disclosed embodiments may include aggregation of data from the items of the low-level board that are linked to. Disclosed embodiments may include at least some of the imported extracted data is presented in each of the groups in the low-level board. Disclosed embodiments may include at least one associated high-level board is configured to hold sprint backlog data or metadata. Disclosed embodiments may include the at least one external column is a linkage column, the low-level board includes a plurality of linkage columns, and each of the plurality of linkage columns contains additional links to each of a plurality of associated high-level boards. Disclosed embodiments may include the low-level board includes a plurality of linkage external columns, and wherein each of the plurality of external columns contains additional links to each of a plurality of associated high-level boards. Disclosed embodiments include the external group-by is configured to: reorganize rows on the low-level board into a plurality of groups by common external column data; access on the low-level board, the additional links to the plurality of associated high-level boards; extract additional data from the plurality of associated high-level boards; and import the extracted additional data onto the low-level board. Disclosed embodiments may include the imported data influences one or more of a sorting or an arrangement of items in at least one group of the low-level board. Disclosed embodiments may, include the external group-by control and internal group-by control are configured for simultaneous performance to reorganize rows on the low-level board based on common internal column data and common external column data. Disclosed embodiments may include each row of a plurality of rows on the at least one associated high—level board is configured to hold data associated with a specific sprint. Disclosed embodiments may include data associated with the specific sprint is linked to the specific sprint via the at least one external column. Disclosed embodiments may include at least one associated high-level board is configured to hold sprint backlog data. Disclosed embodiments may include the imported data from the high-level is utilized in the low-level board.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality-, and operation of possible implementations of systems, methods, and computer hardware or software products according to various exemplary disclosed embodiments. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosed embodiments. It is intended that the specification and examples be considered as example only, with a true scope and spirit of protection being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non—transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer readable medium containing instructions that when executed by at least one processor cause the at least one processor to perform operations for managing a plurality of sprints using a plurality of electronically linked boards, the operations comprising:
generating a low-level board with rows and columns, the rows and columns for containing sprint-related function data associated with the plurality of sprints;
generating at least one internal column and at least one external column on the low-level board, the at least one external column for containing links to at least one associated high-level board;

presenting an activatable internal group-by control;
presenting an activatable external group-by control;
receiving a first indication of activation of the internal group-by control;
in response to the first indication, organizing rows on the low-level board into first groups based on common internal column data;
receiving a second indication of activation of the external group-by control; and
in response to the second indication:
reorganizing rows on the low-level board into second groups based on common external column data;
accessing on the low-level board, the links to the at least one associated high-level board;
extracting data from the at least one associated high-level board; and
importing the extracted data onto the low-level board.

2. The non-transitory computer readable medium of claim 1, wherein each row of a plurality of rows on the at least one associated high-level board is configured to hold data associated with a specific sprint.

3. The non-transitory computer readable medium of claim 1, wherein there is aggregation of data from the items of the low-level board that are linked to.

4. The non-transitory computer readable medium of claim 1, wherein at least some of the imported extracted data is presented in each of the groups in the low-level board.

5. The non-transitory computer readable medium of claim 1, wherein the at least one associated high-level board is configured to hold sprint backlog data or metadata.

6. The non-transitory computer readable medium of claim 1, wherein the at least one external column is a linkage column,
the low-level board includes a plurality of linkage columns, and each of the plurality of linkage columns contains additional links to each of a plurality of associated high-level boards.

7. The non-transitory computer readable medium of claim 1, wherein the imported data influences one or more of a sorting or an arrangement of items in at least one group of the low-level board.

8. A method for managing at least one task across a plurality of workflow management boards based on electronic data value changes across the plurality of workflow management boards, the method comprising:
generating a low-level board with rows and columns, the rows and columns for containing sprint-related function data associated with a plurality of sprints;
generating at least one internal column and at least one external column on the low-level board, the at least one external column for containing links to at least one associated high-level board;
presenting an activatable internal group-by control;
presenting an activatable external group-by control;
receiving a first indication of activation of the internal group-by control;
in response to the first indication, organizing rows on the low-level board into first groups based on common internal column data;
receiving a second indication of activation of the external group-by control; and
in response to the second indication:
reorganizing rows on the low-level board into second groups based on common external column data;
accessing on the low-level board, the links to the at least one associated high-level board;
extracting data from the at least one associated high-level board; and
importing the extracted data onto the low-level board.

9. The method of claim 8, wherein each row of a plurality of rows on the at least one associated high-level board is configured to hold data associated with a specific sprint.

10. The method of claim 8, wherein there is aggregation of data from the items of the low-level board that are linked to.

11. The method of claim 8, wherein at least some of the imported extracted data is presented in each of the groups in the low-level board.

12. The method of claim 8, wherein the at least one associated high-level board is configured to hold sprint backlog data or metadata.

13. The method of claim 8, wherein
the at least one external column is a linkage column,
the low-level board includes a plurality of linkage columns, and
each of the plurality of linkage columns contains additional links to each of a plurality of associated high-level boards.

14. The method of claim 8, wherein the imported data influences one or more of a sorting or an arrangement of items in at least one group of the low-level board.

15. A system for managing at least one task across a plurality of workflow management boards based on electronic data value changes across the plurality of workflow management boards, the system comprising:
at least one processor configured to:
generate a low-level board with rows and columns, the rows and columns for containing sprint-related function data associated with a plurality of sprints;
generate at least one internal column and at least one external column on the low-level board, the at least one external column for containing links to at least one associated high-level board;
present an activatable internal group-by control;
present an activatable external group-by control;
receive a first indication of activation of the internal group-by control;
in response to the first indication, organize rows on the low-level board into first groups based on common internal column data;
receive a second indication of activation of the external group-by control; and
in response to the second indication:
reorganize rows on the low-level board into second groups based on common external column data;
access on the low-level board, the links to the at least one associated high-level board;
extract data from the at least one associated high-level board; and
import the extracted data onto the low-level board.

16. The system of claim 15, wherein each row of a plurality of rows on the at least one associated high-level board is configured to hold data associated with a specific sprint.

17. The system of claim 15, wherein at least some of the imported extracted data is presented in each of the groups in the low-level board.

18. The system of claim 15, wherein the at least one associated high-level board is configured to hold sprint backlog data or metadata.

19. The system of claim 15, wherein
the at least one external column is a linkage column,
the low-level board includes a plurality of linkage columns, and
each of the plurality of linkage columns contains additional links to each of a plurality of associated high-level boards.

20. The system of claim 15, wherein the imported data influences one or more of a sorting or an arrangement of items in at least one group of the low-level board.

* * * * *